United States Patent
Mason et al.

(10) Patent No.: US 12,271,957 B2
(45) Date of Patent: Apr. 8, 2025

(54) WELL OPERATION TASK MANAGEMENT INTERFACE

(71) Applicant: Chevron U.S.A. Inc., San Ramon, CA (US)

(72) Inventors: Brandon Allen Mason, Houston, TX (US); Randy Todd Genzer, Houston, TX (US); Andrea Richardson, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 145 days.

(21) Appl. No.: 17/877,586

(22) Filed: Jul. 29, 2022

(65) Prior Publication Data

US 2024/0037473 A1     Feb. 1, 2024

(51) Int. Cl.
*G06Q 50/02* (2024.01)
*G06F 9/451* (2018.01)
*G06Q 10/0631* (2023.01)

(52) U.S. Cl.
CPC ............. *G06Q 50/02* (2013.01); *G06F 9/451* (2018.02); *G06Q 10/06316* (2013.01)

(58) Field of Classification Search
CPC .............. G06Q 10/06316; G06Q 50/02; G06F 9/451
See application file for complete search history.

(56) References Cited

U.S. PATENT DOCUMENTS

| | | |
|---|---|---|
| 6,826,483 B1 | 11/2004 | Anderson |
| 6,836,731 B1 * | 12/2004 | Whalley ............... E21B 43/00 702/13 |
| 6,983,188 B2 | 1/2006 | Loughran |
| 7,010,760 B2 | 3/2006 | Arnstein |
| 7,366,678 B2 | 4/2008 | Greenstein |
| 7,774,184 B2 | 8/2010 | Balci |
| 7,876,465 B2 | 1/2011 | Matsueda |
| 9,506,305 B2 | 11/2016 | Leuchtenberg |
| 10,385,674 B2 | 8/2019 | Ahmed |
| 10,678,967 B2 | 6/2020 | Babin |
| 11,282,011 B2 | 3/2022 | Richardson |
| 2001/0055123 A1 | 12/2001 | Ryan |
| 2002/0040312 A1 | 4/2002 | Dhar |
| 2002/0052769 A1 | 5/2002 | Navani |
| 2003/0153991 A1 | 8/2003 | Visser |
| 2006/0074730 A1 | 4/2006 | Shukla |
| 2007/0136117 A1 | 6/2007 | Matsueda |

(Continued)

OTHER PUBLICATIONS

Todorov, Non-Productive Time Reduction Using Heuristic Wellbore Hydraulics Modelling, Master Thesis, Montanuniversitaet Leoben (2017) (Year: 2017).*

*Primary Examiner* — Charles Guiliano

(74) *Attorney, Agent, or Firm* — ESPLIN & ASSOCIATES, PC

(57) ABSTRACT

A graphical user interface provides visualization of operation tasks for a well ordered in a sequence. The graphical user interface shows different types of timing for the operation tasks, such as planned timing, estimated timing, and actual timing for the operation tasks. Different types of timing are arranged in a hierarchy so that setting one type of timing for an operation task overrides another type of timing for the operation task. Changes to timing of an operation task are automatically propagated to other operation tasks.

16 Claims, 9 Drawing Sheets

(56) References Cited

U.S. PATENT DOCUMENTS

| | | |
|---|---|---|
| 2007/0199721 A1 | 8/2007 | Givens |
| 2007/0266368 A1 | 11/2007 | Szpak |
| 2008/0046834 A1 | 2/2008 | Yu |
| 2008/0091496 A1 | 4/2008 | Gurpinar |
| 2008/0126168 A1 | 5/2008 | Carney |
| 2009/0125362 A1 | 5/2009 | Reid |
| 2009/0216453 A1 | 8/2009 | Zaeper |
| 2009/0234699 A1 | 9/2009 | Steinglass |
| 2010/0306637 A1 | 12/2010 | Jacobs |
| 2012/0117104 A1* | 5/2012 | Stundner ................ G06Q 10/00 707/769 |
| 2012/0123863 A1 | 5/2012 | Kaul |
| 2013/0139164 A1 | 5/2013 | Balko |
| 2014/0196949 A1 | 7/2014 | Hareland |
| 2015/0067687 A1 | 3/2015 | Turner |
| 2015/0090498 A1 | 4/2015 | Hareland |
| 2016/0163078 A1* | 6/2016 | Germain ................ G01V 1/003 715/209 |
| 2017/0364852 A1 | 12/2017 | Grabovski |
| 2018/0075544 A1 | 3/2018 | Passolt |
| 2018/0113962 A1 | 4/2018 | Babin |
| 2018/0266233 A1 | 9/2018 | Ahmed |
| 2018/0329372 A1* | 11/2018 | Nixon ................ G05B 13/026 |
| 2019/0178059 A1 | 6/2019 | Zheng |
| 2019/0390547 A1* | 12/2019 | Pietrzyk ................ G05B 15/02 |
| 2020/0327481 A1 | 10/2020 | Allouche |
| 2020/0355063 A1 | 11/2020 | Van Vliet |
| 2020/0370413 A1 | 11/2020 | Phillips |
| 2021/0312368 A1 | 10/2021 | Richardson |

\* cited by examiner

| Sections | Code | Task | Start Time | End Time | Planned | Estimate | Actual | NPT | Note | ••• |
|---|---|---|---|---|---|---|---|---|---|---|
| ------- | ------- | ------- | 12/07 10:00 AM | 12/08 4:45 AM | 18.75 | ☐ | ☐ | ☐ | ✚ | ••• |
| ------- | ------- | ------- | 12/08 4:45 AM | 12/08 5:00 PM | 12.25 | ☐ | ☐ | ☐ | ✚ | ••• |
| ------- | ------- | ------- | 12/08 5:00 PM | 12/08 6:45 PM | 1.75 | ☐ | ☐ | ☐ | ✚ | ••• |
| ------- | ------- | ------- | 12/08 6:45 PM | 12/09 12:30 AM | 5.75 | ☐ | ☐ | ☐ | ✚ | ••• |
| ------- | ------- | ------- | 12/09 12:30 PM | 12/09 1:30 AM | 1 | ☐ | ☐ | ☐ | ✚ | ••• |
| ------- | ------- | ------- | 12/09 1:30 AM | 12/09 1:45 AM | 0.25 | ☐ | ☐ | ☐ | ✚ | ••• |
| Section Summary | | | | | | # | # | | Task Count # | |

FIG. 4A

| Sections | Code | Task | Start Time | End Time | Planned | Estimate | Actual | NPT | Note | ... |
|---|---|---|---|---|---|---|---|---|---|---|
| ------- | ------- | ------- | 12/07 10:00 AM | 12/08 10:00 AM | 18.75 | 24 | ☐ | ☐ | ✚ | ••• |
| ------- | ------- | ------- | 12/08 10:00 AM | 12/08 10:15 PM | 12.25 | ☐ | ☐ | ☐ | ✚ | ••• |
| ------- | ------- | ------- | 12/08 10:15 PM | 12/09 12:00 AM | 1.75 | ☐ | ☐ | ☐ | ✚ | ••• |
| ------- | ------- | ------- | 12/09 12:00 AM | 12/09 8:00 AM | 5.75 | 8 | ☐ | ☐ | ✚ | ••• |
| ------- | ------- | ------- | 12/09 8:00 AM | 12/09 9:00 AM | 1 | ☐ | ☐ | ☐ | ✚ | ••• |
| ------- | ------- | ------- | 12/09 9:00 AM | 12/09 9:15 AM | 0.25 | ☐ | ☐ | ☐ | ✚ | ••• |
| Section Summary | | | | | | # | # | Task Count # | | |

FIG. 4B

| Sections | Code | Task | Start Time | End Time | Planned | Estimate | Actual | NPT | Note | ... |
|---|---|---|---|---|---|---|---|---|---|---|
| | ------ | ------ | 12/07 10:00 AM | 12/07 10:00 PM | 10.75 | | 12 | ■ | + | ... |
| | NPT ------ | ------ | 12/07 10:00 PM | 12/08 1:00 AM | 0 | 3 | | □ | + | ... |
| | Resume ------ | ------ | 12/08 1:00 AM | 12/08 7:45 AM | 6.75 | | | □ | + | ... |
| | ------ | ------ | 12/08 7:45 AM | 12/09 8:00 PM | 12.25 | | | □ | + | ... |
| | ------ | ------ | 12/09 8:00 PM | 12/09 9:45 PM | 1.75 | | | □ | + | ... |
| | ------ | ------ | 12/09 9:45 PM | 12/09 3:30 AM | 5.75 | 8 | | □ | + | ... |
| Section Summary | | | | | # | # | # | | Task Count # | |

FIG. 4E

WELL OPERATION TASK MANAGEMENT INTERFACE

FIELD

The present disclosure relates generally to the field of managing tasks for well operations.

BACKGROUND

Efficient operation of a well requires accurate planning of tasks at the well site. Changes in timing of tasks at the well site may make planning of tasks at the well site both difficult and time-consuming. For example, well site forecasted tasks may be constantly changing as forecasted times are replaced with actual times after the tasks have been completed, making it difficult and time consuming to plan tasks at the well site.

SUMMARY

This disclosure relates to managing tasks. Operation information for a well and/or other information may be obtained. The operation information may define operation tasks for the well. Presentation of a graphical user interface on a display may be effectuated. The graphical user interface may include visualization of the operation tasks for the well. The visualization of the operation tasks for the well may include the operation tasks ordered in a sequence. The graphical user interface may further include a hierarchical timing element for the operation tasks. The hierarchical timing element may enable setting of timing of the operation tasks using different types of timing. Setting of a first type of timing may override setting of a second type of timing for a given operation task. User interaction with the hierarchical timing element may be received. The user interaction with the hierarchical timing element may indicate one or more aspects to which the timing of the given operation task is to be set. The setting of the timing of the given operation task as indicated by the user interaction with the hierarchical timing element may change the timing of the given operation task. The visualization of the operation tasks of the well may be modified to reflect change in the timing of the operation tasks based on the change in the timing of the given operation task and/or other information.

A system for managing tasks may include one or more electronic storage, one or more processors and/or other components. The electronic storage may store operation information, information relating to a well, information relating to operation tasks for the well, information relating to a graphical user interface, information relating to visualization of operation tasks for the well, information relating to timing of operation tasks for the well, and/or other information.

The processor(s) may be configured by machine-readable instructions. Executing the machine-readable instructions may cause the processor(s) to facilitate managing tasks. The machine-readable instructions may include one or more computer program components. The computer program components may include one or more of an operation information component, a presentation component, a user interaction component, a modification component, and/or other computer program components.

The operation information component may be configured to obtain operation information for a well and/or other information. The operation information may define operation tasks for the well. In some implementations, the operation tasks for the well may be grouped based on hole sections for the well and/or other information.

The presentation component may be configured to effectuate presentation of a graphical user interface on a display. The graphical user interface may include visualization of the operation tasks for the well. The visualization of the operation tasks for the well may include the operation tasks ordered in a sequence. The graphical user interface may further include a hierarchical timing element for the operation tasks. The hierarchical timing element may enable setting of timing of the operation tasks using different types of timing. Setting of a first type of timing may override setting of a second type of timing for a given operation task.

In some implementations, the different types of timing provided by the hierarchical timing element may include planned timing, estimated timing, actual timing, and/or other timing. Setting of the estimated timing for the given operation task may override setting of the planned timing for the given operation task. Setting of the actual timing for the given operation task may override setting of the planned timing and/or the estimated timing for the given operation task.

The user interaction component may be configured to receive user interaction with the hierarchical timing element. The user interaction with the hierarchical timing element may indicate one or more aspects to which the timing of the given operation task is to be set. The setting of the timing of the given operation task as indicated by the user interaction with the hierarchical timing element may change the timing of the given operation task.

The modification component may be configured to modify the visualization of the operation tasks of the well. The visualization of the operation tasks of the well may be modified to reflect change in the timing of the operation tasks based on the change in the timing of the given operation task and/or other information.

In some implementations, the change in the timing of the operation tasks based on the change in the timing of the given operation task may include change in the timing of one or more subsequent operation tasks and/or other operation tasks. The subsequent operation task(s) may occur after the given operation task.

In some implementations, the change in the timing of the operation tasks based on the change in the timing of the given operation task may further include change in the timing of one or more preceding operation tasks and/or other operation tasks. The preceding operation task(s) may occur before a given subsequent operation task. The change in the timing of the preceding operation task(s) may include change in the timing of one or more logistic tasks tied to the given subsequent operation task.

In some implementations, the graphical user interface may further include a task list element for the given subsequent operation task. The logistic task(s) tied to the given subsequent operation task may be presented responsive to user interaction with the task list element.

In some implementations, the graphical user interface may further include a non-productive time element for the operation tasks. The non-productive time element may enable setting of non-productive time for the given operation task. Responsive to the setting of the non-productive time for the given operation task, the given operation task may be split into two sub-operation tasks surrounding the non-productive time.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIGS. 4A, 4B, 4C, 4D, and 4E illustrate example views of a graphical user interface.

DETAILED DESCRIPTION

The present disclosure relates to methods and systems for managing tasks. A graphical user interface provides visualization of operation tasks for a well ordered in a sequence. The graphical user interface shows different types of timing for the operation tasks, such as planned timing, estimated timing, and actual timing for the operation tasks. Different types of timing are arranged in a hierarchy so that setting one type of timing for an operation task overrides another type of timing for the operation task. Changes to timing of an operation task are automatically propagated to other operation tasks.

Figure 1:
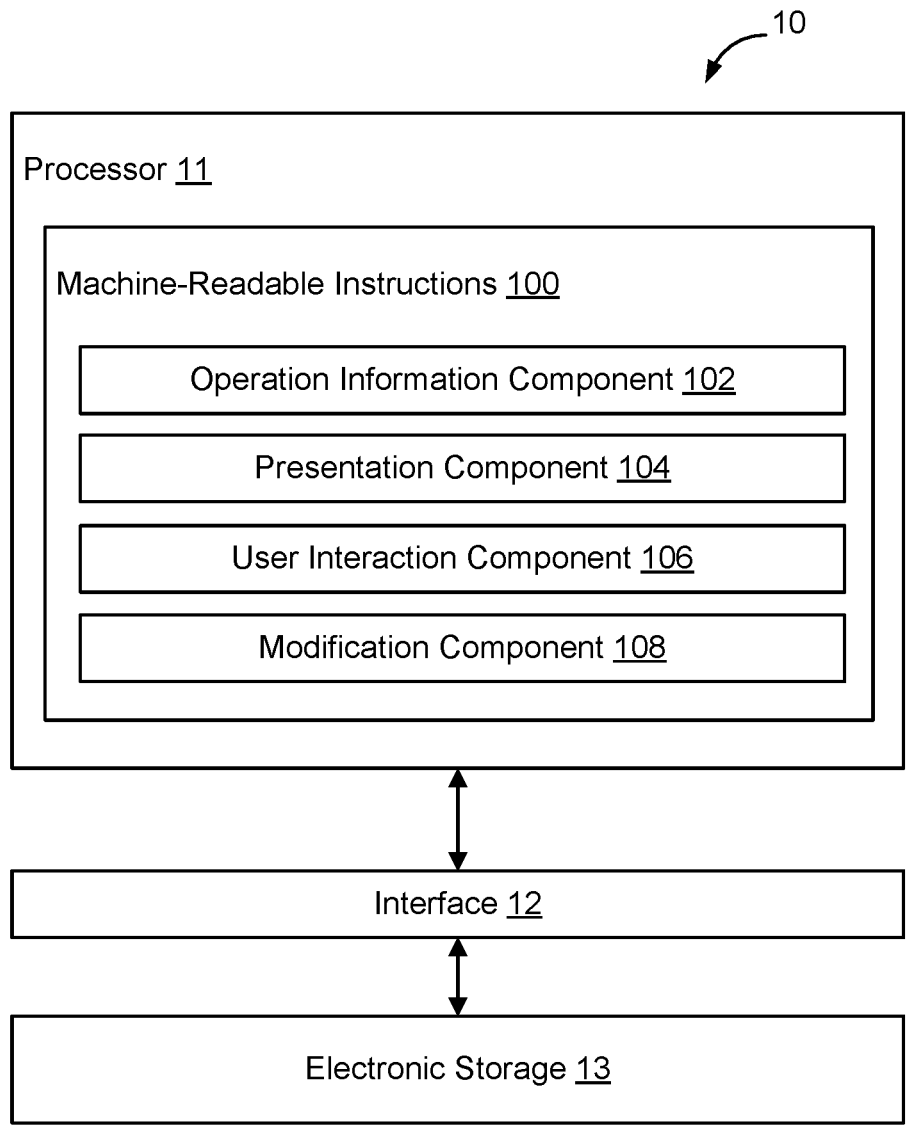
FIG. 1 illustrates an example system for managing tasks.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components. Operation information for a well and/or other information may be obtained by the processor 11. The operation information may define operation tasks for the well. Presentation of a graphical user interface on a display may be effectuated by the processor 11. The graphical user interface may include visualization of the operation tasks for the well. The visualization of the operation tasks for the well may include the operation tasks ordered in a sequence. The graphical user interface may further include a hierarchical timing element for the operation tasks. The hierarchical timing element may enable setting of timing of the operation tasks using different types of timing. Setting of a first type of timing may override setting of a second type of timing for a given operation task. User interaction with the hierarchical timing element may be received by the processor 11. The user interaction with the hierarchical timing element may indicate one or more aspects to which the timing of the given operation task is to be set. The setting of the timing of the given operation task as indicated by the user interaction with the hierarchical timing element may change the timing of the given operation task. The visualization of the operation tasks of the well may be modified by the processor 11 to reflect change in the timing of the operation tasks based on the change in the timing of the given operation task and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store operation information, information relating to a well, information relating to operation tasks for the well, information relating to a graphical user interface, information relating to visualization of operation tasks for the well, information relating to timing of operation tasks for the well, and/or other information.

Efficient operation of a well requires accurate planning of tasks at the well site. For example, a well site may require capability to forecast tasks to help in the planning of when items are needed at the well site. Manually tracking and/or organizing tasks at the well site (such as via spreadsheets) may be difficult and time consuming.

The present disclosure provides a planning, scheduling, and forecasting tool that consolidates well site tasks demands into one digital portal. The tool may predict when materials and/or equipment needed are needed at the well site, and may automatically update tasks based on real time data. The tool may enable sharing of information to optimize planning and performance of tasks. The tool may generate a list of tasks for a well to include a standard list of tasks with calculated times and/or include list of tasks and times from other (e.g., previously completed/in-progress) well/hole sections. Tasks for a well may be associated with logistic tasks (e.g., standard logistic tasks, logistic tasks from other well/hole sections). Ordering and timing of individual tasks may be manipulatable by a user, and user manipulation of the tasks may be automatically propagated to other tasks, including logistic tasks. The tool may provide visualization of the tasks as a list of tasks and/or in calendar form.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate managing tasks. The machine-readable instructions 100 may include one or more computer program components. The machine-readable instructions 100 may include one or more of an operation information component 102, a presentation component 104, a user interaction component 106, a modification component 108, and/or other computer program components.

The operation information component 102 may be configured to obtain operation information for a well and/or other information. Obtaining operation information may include one or more of accessing, acquiring, analyzing, determining, examining, generating, identifying, loading, locating, opening, receiving, retrieving, reviewing, selecting, storing, utilizing, and/or otherwise obtaining the operation information. The operation information component 102 may be configured to obtain the operation information from one or more locations. For example, the operation information component 102 may obtain operation information from a storage location, such as the electronic storage 13, electronic storage of a device accessible via a network, and/or other locations. The operation information component 102 may obtain operation information from one or more hardware components (e.g., a computing device, a component of a computing device, a sensor, a component of a drilling tool) and/or one or more software components (e.g., software running on a computing device). The operation information may be obtained from a single source or from multiple sources. The operation information may be stored within a single file or multiple files.

The operation information component 102 may be configured to obtain the operation information before, during, and/or after performance of one or more operation tasks. For example, the operation information component 102 may obtain the operation information for a well before operations tasks are performed. The operation information component 102 may obtain the operation information during performance of operation tasks to obtain real-time data for the well. The operation information component 102 may obtain the operation information after operation tasks have been performed to obtain historical data for the well.

The operation information may define operation tasks for a well. A well may refer to a hole or a tunnel in the ground. A well may be drilled in the ground for exploration and/or recovery of natural resources in the ground. For example, a well may be drilled in the ground to aid in extraction of petrochemical fluid (e.g., oil, gas, petroleum, fossil fuel). A well may be drilled in one or more directions. For example, a well may include a vertical well, a horizontal well, a deviated well, and/or other type of well.

An operation task for a well may refer to a task relating to operation of a well. An operation task for a well may refer to a piece of work relating to operation of a well. An operation task for a well may refer to work, job, assignment, and/or other task to be performed for and/or at the well. An operation task for a well may refer to a task relating to performance of work on and/or using the well. An operation task for a well may include one or more activities. An operation task for a well may include one or more activities at the well, one or more activities using the well, one or more activities at the well site, one or more activities to facilitate operation of the well, and/or other activities. An operation task for a well may be associated with one or more stages of well usage, such as a well site preparation stage (preparation of aboveground infrastructure, such as pads and access roads), a drilling stage (drilling the well), a cementing stage (well casing insertion and cementing), a well completion stage (making the well ready for production), a production stage (recovery of natural resources), a well abandonment stage, and/or other stages. An operation task for a well may include one or more logistic tasks for the well (e.g., delivery of materials/equipment to the well site, removal of materials/equipment from the well site, preparation of materials/equipment for usage at the well site). Other types of operation tasks for a well are contemplated.

The operation information may define operation tasks for a well by characterizing, describing, delineating, identifying, quantifying, reflecting, setting forth, and/or otherwise defining the operation tasks for the well. The operation information may define operation tasks for a well by including information that describes, delineates, identifies, is associated with, quantifies, reflects, sets forth, and/or otherwise defines one or more of content, quality, attribute, feature, and/or other aspects of the operation tasks for the well. For example, the operation information may include information that identifies operation tasks to be performed, conditions and/or parameters for performance of the operation tasks, and/or timing of the operation tasks. Other types of operation information are contemplated.

In some implementations, the operation information for a well may be obtained based on sufficient information for the well being available for use. For example, specific information for a well may be required to manage operation tasks for the well using the tool of the current disclosure. When those specific information for the well has been entered into a database, the well may be input into the tool for operation task management. Example types of information that may be required for use of the well in the tool may include start date/time, job type, business unit, rig/unit type, platform/jacket/pada, well name, well category, phases, rig unit contractor, rig unit name, and/or other types of information.

In some implementations, the operation tasks for the well may be grouped based on hole sections for the well and/or other information. Hole sections for a well may refer to different parts of the well. Hole sections for a well may refer to different stages of drilling the well. Hole sections for a well may refer to different types of formations surrounding the well. Grouping of operation tasks for a well based on hole sections may enable management of operation tasks by hole sections.

In some implementations, the operation tasks for a well may be determined based on one or more defaults. For example, a database may include information on specific operation tasks to be performed, information on how the operation tasks are to be performed, information on timing of the operation tasks, information on related tasks that needs to be performed, and/or other information relating to operation tasks for different types of well. Operation tasks for a particular type of well may be determined based on retrieval of information relating to the particular type of well from the database. Organization and retrieval of information on operation tasks from a database based on other criteria are contemplated.

In some implementations, the operation tasks for a well may be determined based on historical information. For example, a database may include historical information on tasks performed at specific wells/hole sections, such as historical information on specific operation tasks performed at the wells/hole sections, information on how the operation tasks were performed at the wells/hole sections, information on timing of the operation tasks at the wells/hole sections, information on related tasks at the wells/hole sections, and/or other information relating to operation tasks at different wells/hole sections. Operation tasks for a particular well may be determined based on retrieval of historical information from other well(s) and/or other hole section(s). Operation tasks for a particular well may be determined by copying operation tasks performed at other well(s)/hole sections.

The presentation component 104 may be configured to effectuate presentation of one or more graphical user interfaces. The graphical user interface(s) may be presented on one or more displays. A display may refer to an electronic device that provides visual presentation of information.

A graphical user interface may refer to a user interface that enables the system to provide information to a user through one or more interface elements of the graphical user interface. A graphical user interface may refer to a user interface that enables the system 10 to receive information from a user (user input) through one or more interface elements of the graphical user interface. An interface element of a graphical user interface may refer to a graphical element of the graphical user interface, such as window, icon, button, graphic, visual indicator, and/or other graphical element. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10.

A graphical user interface may facilitate interaction of a user with one or more of the interface elements via the user input received through one or more user interface devices (e.g., touchscreen display, keyboard, mouse, trackpad) and/or other user input. For example, a graphical user interface may present/include the interface elements in a particular arrangement and enable a user to interact with individual interface elements by engaging with locations corresponding to the individual interface elements on a touchscreen display.

A graphical user interface may be static or dynamic. A graphical user interface may include a static configuration of interface elements and/or include dynamic configurations of interface elements that change (e.g., with time, based on user interaction with one or more interface elements).

A graphical user interface may convey information in one or more visual forms via the interface element(s). A graphical user interface may include visualization of the operation tasks for the well. A graphical user interface may include visualization of the operation tasks for the well by including interface element(s) that provide one or more visual representation of the operation tasks for the well. Visual representations of the operation tasks for the well may include numerical representations, textual representations, graphical representations, and/or other visual representations.

The user interaction component 106 may be configured to receive user interaction with one or more interface elements of the graphical user interface(s). Receiving user interaction with an interface element may include detecting, determining, discerning, discovering, finding, identifying, and/or other receiving user interaction with the interface element. Receiving user interaction with an interface element may include determining how a user interacted with the interface element. Receiving user interaction with an interface element may include interpreting user interaction with the interface element into one or more commands (e.g., interpreting user interaction within a hierarchical timing element which indicates aspect(s) to which timing of an operation task is to be set into command(s) to change the timing of the operation task; interpreting user interaction with a task list element into command(s) to present logistic task(s) tied to an operation task; interpreting user interaction with a non-productive time element into command(s) to set non-productive time for an operation task). The user interaction component 106 may be configured to receive user interaction performed through one or more user interface devices (e.g., touchscreen display, keyboard, mouse, trackpad).

The modification component 108 may be configured to modify the graphical user interface(s). Modifying a graphical user interface may include changing one or more parts of the graphical user interface. Modifying a graphical user interface may include adding one or more new interface elements to the graphical user interface, removing one or more existing interface elements from the graphical user interface, changing one or more existing interface elements within the graphical user interface, and/or otherwise modifying the graphical user interface. In some implementations, modifying a graphical user interface may include replacing an existing graphical user interface with a new graphical user interface.

The modification component 108 may be configured to modify the graphical user interface(s) based on the user interaction with the interface element(s) of the graphical user interface(s) and/or other information. The modification component 108 may be configured to modify the visualization of the operation tasks of the well. For example, setting the timing of a particular operation task as indicated by user interaction with the hierarchical timing element may change the timing of the particular operation task. The change in the timing of the particular operation task may be automatically propagated to other operation tasks. The modification component 108 may modify the visualization of the operation tasks of the well to reflect change in the timing of multiple operation tasks based on the change in the timing of the particular operation task and/or other information. As another example, the modification component 108 may modify the graphical user interface(s) to present logistic task(s) tied to an operation task based on user interaction with a task list element and/or other information. As yet another example, the modification component 108 may modify the graphical user interface(s) to show changes in the operation tasks based on non-productive time being set for an operation task. Other modifications of graphical user interfaces are contemplated.

FIGS. 3, 4A, 4B, 4C, 4D, 4E, and 5 illustrate example graphical user interfaces 300, 400, 500. The graphical user interfaces 300, 400, 500 shown in FIGS. 3, 4A, 4B, 4C, 4D, 4E, and 5 are provided merely as examples, and the arrangement and visual aspects of a graphical user interface may vary depending on the implementation. In some implementations, a graphical user interface may include additional features and/or alternative features. In some implementations, a graphical user interface may not include features shown in FIGS. 3, 4A, 4B, 4C, 4D, 4E, and 5. Other graphical user interfaces are contemplated.

Figure 3:
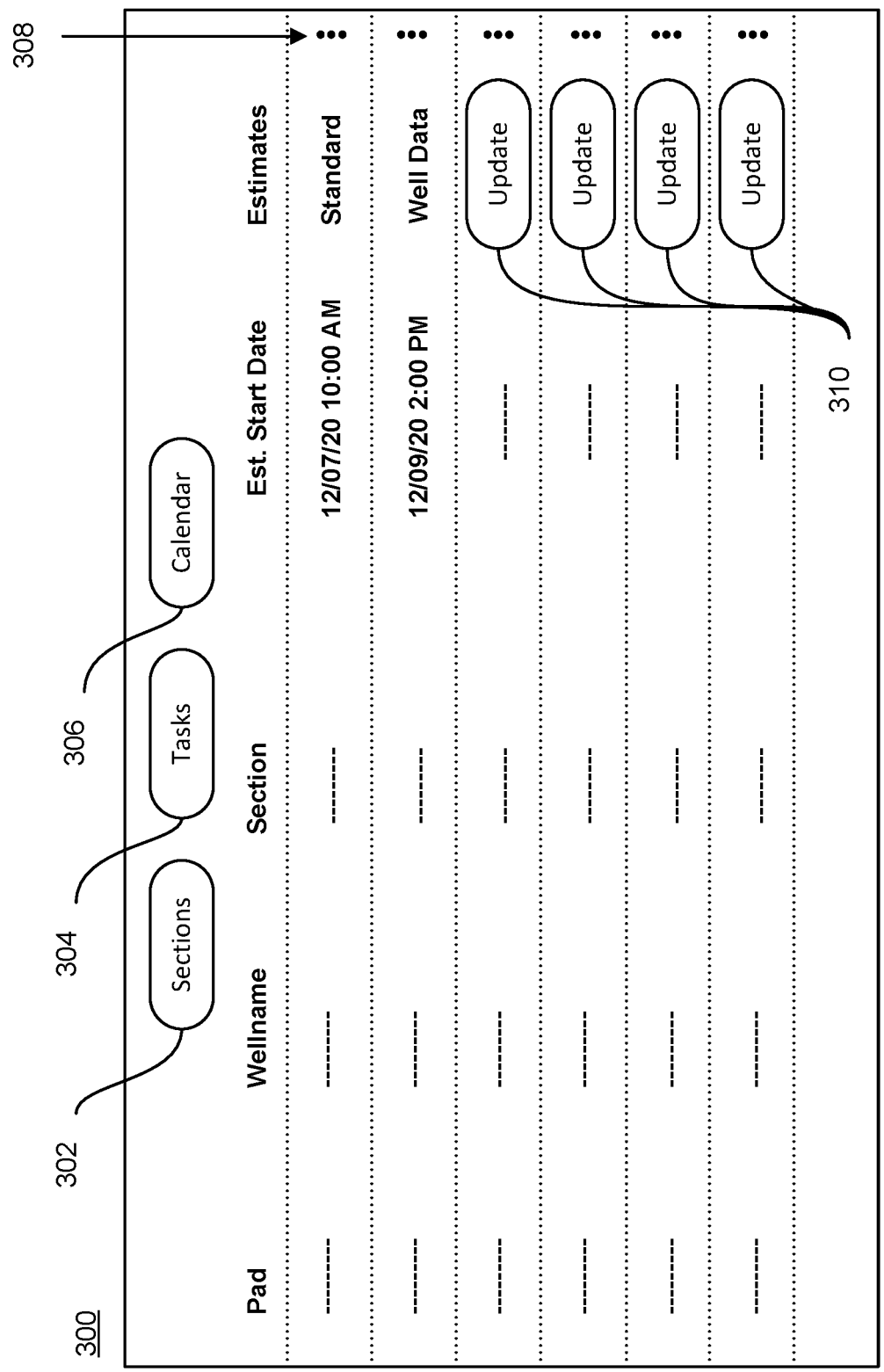
FIG. 3 illustrates an example graphical user interface.

Referring to FIG. 3, the graphical user interface 300 may include visualization of hole sections. The visualization of the hole sections may include a list of different hole sections. The visualization of the hole sections may include numerical representations, textual representations, graphical representations, and/or other visual representations of the hole sections. For example, the graphical user interface 300 may include a listing of different hole sections with information on pad, well identifier, section identifier, estimated start date/time, and/or other information relating to the hole sections.

Information for one or more hole sections may be obtained from one or more sources. For example, operation tasks to be performed for a hole section may be determined based on use of one or more defaults. For example, a standard list of operation tasks, along with standard timing of the operation tasks, may be assigned to a hole section. Operation tasks to be performed for a hole section may be determined from another well/hole section. For example, specific operation tasks performed for a completed/in-progress well/hole section, along with specific timing of those operation tasks, may be assigned to a hole section. The graphical user interface 300 may provide information on the source from which information was obtained for hole sections. For example, the graphical user interface 300 may provide information on whether estimates of timing for hole sections include standard timing (Standard) or copied from a completed/in-progress well/hole section (Well Data).

A user may interact with one or more of the hole sections listed in the graphical user interface 300 to change information relating to the hole sections. For example, a user may change ordering of hole sections by moving a particular hole section to a different locations within the listing. A user may interact with different pieces of information shown for individual hole sections to make changes to the different pieces of information. A user may interact with vertical dots 308 on the right side of individual hole sections to change the individual hole sections (e.g., change information for a hole section, delete a hole section, add a hole section below/above). A user may interact with source elements 310 to control whether operation tasks and timing for individual hole sections will be obtained from a standard list (e.g., standard activity list and generic times) or from a completed/in-progress well/hole section (e.g., specific well data for activity list and specific times). If historical information from a completed/in-progress well/hole section is used to populate operation tasks and timing for a hole section, non-productive time of the completed/in-progress well/hole section may be excluded. That is, import of operation tasks and timing of operation tasks from a completed/in-progress well/hole section may automatically remove non-productive time from the completed/in-progress well/hole section.

The graphical user interface 300 may include a sections view element 302, a tasks view element 304, and a calendar view element 306. User interaction with the sections view element 302 may cause presentation of a graphical user interface that include visualization of hole sections, such as the graphical user interface 300 shown in FIG. 3. User interaction with the tasks view element 304 may cause presentation of a graphical user interface that include visualization of operations tasks in a list form, such as the graphical user interface 400 shown in FIGS. 4A, 4B, 4C, 4D, and 4E. User interaction with the calendar view element 306 may cause presentation of a graphical user interface that include visualization of operation tasks in a calendar form, such as the graphical user interface 500 shown in FIG. 5.

Referring to FIG. 4A, the graphical user interface 400 may include a sections view element 402, a tasks view element 404, and a calendar view element 406. The sections view element 402 may be the same as or similar to the section view element 302. The tasks view element 404 may be the same as or similar to the tasks view element 304. The calendar view element 406 may be the same as or similar to the calendar view element 306.

The graphical user interface 400 may include visualization of operation tasks for a well. In some implementations, the identity of operation tasks for the well and the timing of the operation tasks for the well may be determined based on a standard list of operation tasks, based on operation tasks for another well (e.g., a completed well, an in-progress well), and/or based on other information. For example, which operation tasks are to be performed and the planned time for the operation tasks may be determined based on a standard list of operation tasks, based on operation tasks for another well (e.g., a completed well, an in-progress well), and/or based on other information.

The graphical user interface 400 may include visualization of the operation tasks for the well by including interface element(s) that provide one or more visual representation of the operation tasks for the well. Visual representations of the operation tasks for the well may include numerical representations, textual representations, graphical representations, and/or other visual representations of the operation tasks for the well. For example, the graphical user interface 400 may include a listing of different operation tasks with information on code, task name, start time, end time, planned time, and/or other information relating to the operation tasks. The graphical user interface 400 may include a listing of hole sections for a well that are available for viewing (e.g., on the left side of the graphical user interface 400), and a user may interact with a hole section to see the operation tasks for the hole section. The listing of hole sections may include the same hole sections shown in the graphical user interface 300. The graphical user interface 400 may include a hole section summary for individual hole sections, with the hole section summary providing estimated total time to perform operation tasks for the hole section, actual total time to perform operation tasks for the hole section, number of operation tasks for the hole section, and/or other summary information for the hole section.

The visualization of the operation tasks for the well may include the operation tasks ordered in a sequence. The operation tasks ordered in a sequence may refer to the operation tasks arranged in a particular order. For example, the operation tasks may be listed in the order in which they are to be performed. The operation tasks may be arranged within the graphical user interface 400 based on the timing of the operation tasks. Timing of an operation task may refer to a point or a period of time when the operation task is to start, a point or a period of time when the operation task is to end, a duration of time that the operation task is to take, and/or other aspect of when the operation task is to be performed.

A user may interact with one or more of the operation tasks listed in the graphical user interface 400 to change information relating to the operation tasks. For example, a user may change ordering of operation tasks by moving a particular operation task to a different locations within the listing. A user may interact with different pieces of information shown for individual operation tasks to make changes to the different pieces of information. A user may interact with vertical dots 416 on the right side of individual operation tasks to change the individual operation tasks (e.g., change information for an operation task, delete an operation task, add an operation task below/above). To add an operation task, a user may be required to enter timing (e.g., start time, end time, estimate time) for the operation task.

The graphical user interface 400 may include a hierarchical timing element 408 for the operation tasks. The hierarchical timing element 408 may enable setting of timing of the operation tasks using different types of timing. The hierarchical timing element 408 may enable a user to input command(s) to set specific values for timing of operation tasks. For example, the hierarchical timing element 408 may include fields for a user to enter values of estimated timing and/or actual timing for operation tasks. The hierarchical timing element 408 may include start time and end time for operation tasks. A user may interact with the listed start times or end times for operation tasks to set estimated timing and/or actual timing for operation tasks.

Setting the timing of an operation task may include entering new information regarding the timing of the operation (e.g., new start time, new end time, new time duration). Setting the timing of an operation task may include changing existing information regarding the timing of the operation (e.g., changing start time, changing end time, changing time duration). Different types of timing may be associated with the operation tasks, and setting of one type of timing may override setting of another type of timing for an operation task. Different types of timing may be arranged in a hierarchy so that entry of certain types of timing overrides entry of other types of timing.

For example, different types of timing for the operation tasks may include planned timing, estimated timing, actual timing, and/or other timing. The hierarchical timing element 408 may provide options for a user to set (e.g., enter, change, delete) planned timing, estimated timing, actual timing, and/or other timing for the operation tasks. Planned timing may refer to a duration of time that is planned for performance of an operation task. The value of planned timing may be set based on a standard list of planning timing for operation tasks or how long it took to perform the operation task at another well (e.g., the same section at another well). Estimated timing may refer to a duration of time that is estimated by a user for performance of an operation. Estimated timing may refer to a duration of time that is assigned by a user for performance of an operation. Actual timing may refer to the actual duration of time taken to perform an operation task. Other types of timing are contemplated.

The hierarchy of timing may include different types of arranged so that entry of estimated timing for an operation task overrides planned timing for the operation task, and entry of actual timing for an operation task overrides planned timing and/or estimated timing for the operation task. That is, setting of estimated timing for an operation task may override setting of planned timing for the operation task, while setting of actual timing for an operation task may override setting of planned timing and/or estimated timing for the operation task. Other hierarchies of timing are contemplated.

User interaction with the hierarchical timing element 408 may be received. User interaction with the hierarchical timing element 408 may indicate one or more aspects to which the timing of an operation task is to be set. User interaction hierarchical timing element 408 indicating aspect(s) to which the timing of an operation task is to be set may include the user interaction with the hierarchical timing element 408 defining/specifying a point or a period of time when the operation task is to start, a point or a period of time when the operation task is to end, a duration of time that the operation task is to take, and/or other aspect(s) to which the timing of the operation task is to be set. For example, user interaction with the hierarchical timing element 408 set values of estimated timing and/or actual timing for an operation task. Setting the timing of an operation task as indicated by the user interaction with the hierarchical timing element 408 may change the timing of the operation task. For example, user entry of estimated timing for an operation task may change the duration of time assigned to the operation task from planned timing to the estimated timing. User entry of actual timing for an operation task may change the duration of time assigned to the operation task from planned/estimated timing to the actual timing.

Change in timing of an operation task may be automatically propagated to other operations tasks. Based on change in timing of an operation task, timing of one or more subsequent operation tasks may be changed. A subsequent operation task may refer to an operation task that is to occur (e.g., start) after the operation task that has been changed. For example, timing of an operation task being changed to shorten the duration of time assigned to the operation task may result in beginning and ending times subsequent operation tasks being changed to earlier times. Timing of an operation task being changed to lengthen the duration of time assigned to the operation task may result in beginning and ending times subsequent operation tasks being changed to later times.

Based on change in timing of an operation task, timing of one or more preceding operation tasks may be changed. A preceding operation task may refer to an operation task that is to occur (e.g., start, end) before a subsequent operation task. For example, the graphical user interface may list a first operation task and a second operation task, with the second operation task listed after the first operation task. Based on change in timing of the first operation task, the timing of second operation task may be changed. The second operation task may be tied to one or more operation tasks that needs to be performed before the second operation task can be performed. For example, one or more logistic tasks (e.g., material/equipment delivery, material/equipment removal, material/equipment preparation) may be tied to the second operation task, and the logistic task(s) may need to be performed before the second operation task can performed. Based on change in timing of the second operation task (prompted by change in timing of the first operation tasks), timing of logistic tasks tied to the second operation tasks may be changed.

The visualization of the operation tasks of the well may be modified to reflect change in the timing of the operation tasks based on change in the timing of an operation task and/or other information. That is, the graphical user interface may be automatically updated to show new times for operation tasks based on change in timing of one operation task.

For example, referring to FIG. 4B, a user may have interacted with the hierarchical timing element 408 of the first operation task listed within the graphical user interface 400 to set the estimated timing for the operation task to 24 hours. The planned timing for the operation task may be 18.75 hours. User entry of estimated timing value may override the planned timing value for operation task end time calculation. Based on user entry of 24 hours as estimated timing for the operation task, the end time for the operation task may be changed from December 8 4:45 AM to December 8 10:00 AM (pushed back 5:15). User's change of timing for the operation task may be propagated to other operation tasks so that start and end times of subsequent operations are pushed back by 5:15. User entry of estimated timing for the operation task may change estimated total time to perform operation tasks for the hole section.

A user may have interacted with the hierarchical timing element 408 of the four operation task listed within the graphical user interface 400 to set the estimated timing for the operation task to 8 hours. The planned timing for the operation task may be 5.75 hours. User entry of estimated timing value may override the planned timing value for operation task end time calculation. Based on user entry of 8 hours as estimated timing for the operation task, the end time for the operation task may be changed to December 9 8:00 AM (pushed back 5:15+2:15). User's change of timing for the operation task may be propagated to other operation tasks so that start and end times of subsequent operations are pushed back by 2:15. User entry of estimated timing for the operation task may change estimated total time to perform operation tasks for the hole section.

Figure 4C:
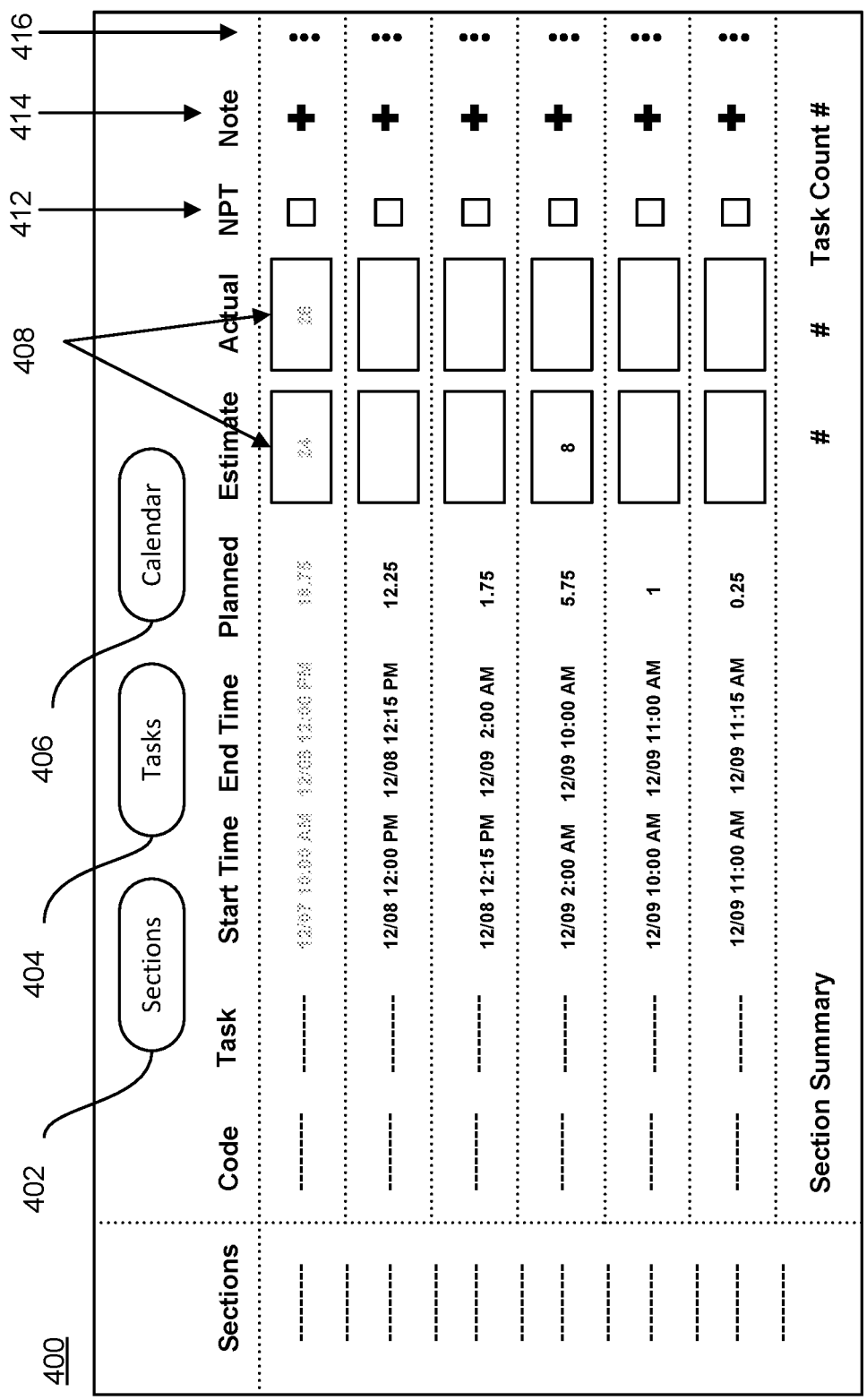
Figure 4D:
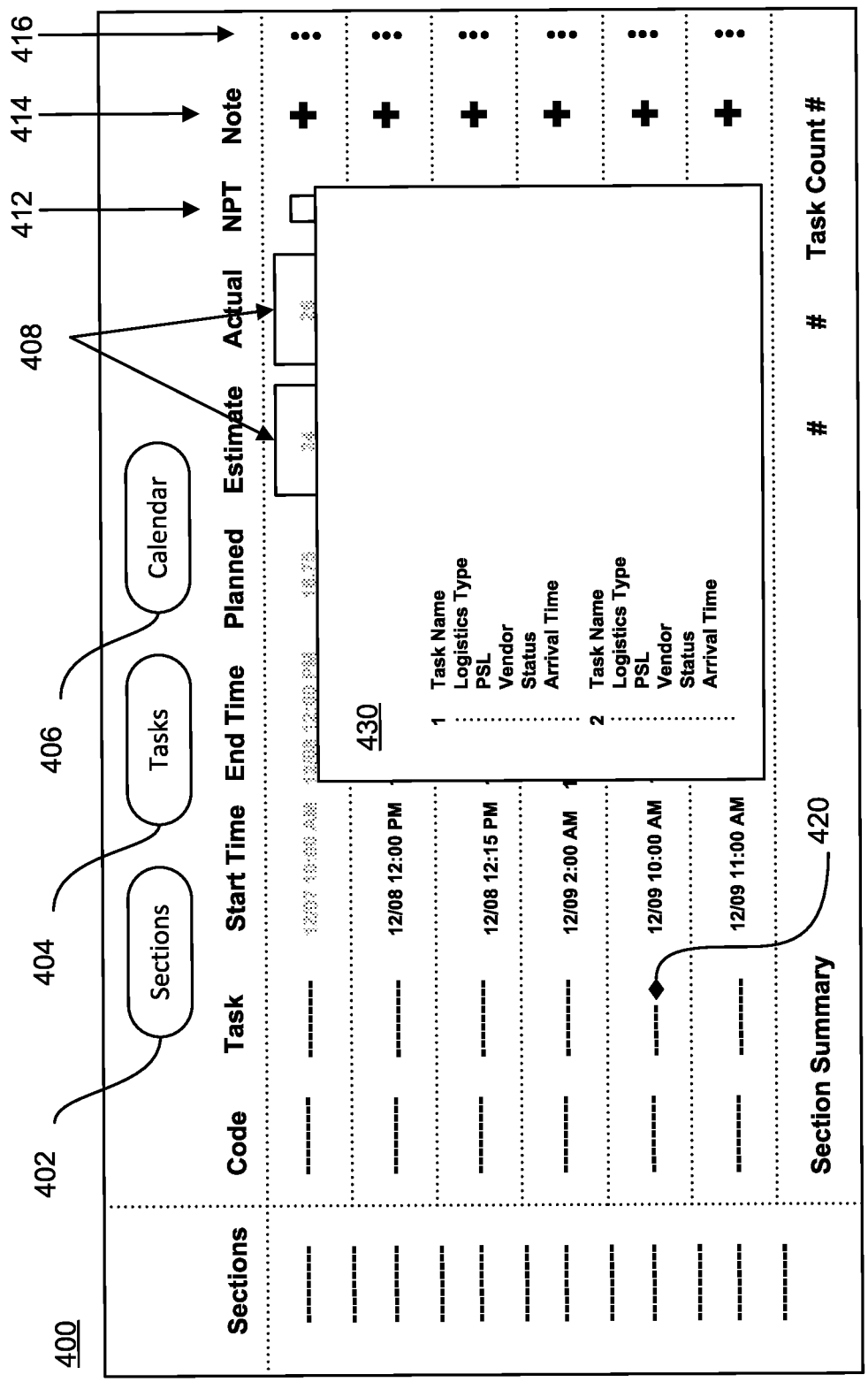

For example, referring to FIG. 4C, a user may have interacted with the hierarchical timing element 408 of the first operation task listed within the graphical user interface 400 to set the actual timing for the operation task to 26 hours. User entry of actual timing value may override both the planned timing value and the estimated timing value for operation task end time calculation. Based on user entry of 26 hours as actual timing for the operation task, the end time for the operation task may be changed from December 8 10:00 AM to December 8 12:00 PM (pushed back 2:00). User's change of timing for the operation task may be propagated to other operation tasks so that start and end times of subsequent operations are pushed back by 2:00. User entry of actual timing for the operation task may change actual total time to perform operation tasks for the hole section.

A user's setting of the actual timing for the operation task may cause the operation task to be marked as completed. The completion of the operation task may be visual indicated within the graphical user interface 400, such as by having the text/numbers for the operation task greyed out. A user may unmark the operation task as being completed by deleted the actual timing for the operation task. For example, a user may interact with the actual timing field of the hierarchical timing element 408 to delete "26" for the first operation task, which may cause the first operation task be to be marked as not completed.

In some implementations, a graphical user interface may include a task list element for an operation task. The task list element may enable a user to see other operation tasks tied to a particular operation task. The task list element may enable a user to input command(s) to present other operation tasks tied to a particular operation task within the graphical user interface. For example, a user may interact with a task list element of an operation task to cause the graphical user interface to present logistic task(s) tied to the operation task. For example, referring to FIG. 4D, the graphical user interface 400 may include a task list element 420 for the fifth operation task listed within the graphical user interface 400. User interaction with the task list element 420 may cause the graphical user interface 400 to present a related operation task list 430. The related operation task list 430 may list operation tasks tied to the fifth operation task.

An operation task tied to another operation task may refer to an operation task that requires the other operation task and/or an operation task that is required by the other operation task. An operation task tied to another operation task may refer to an operation task that needs to be completed before the other operation task can be performed. An operation task tied to another operation task may refer to an operation task that requires the other operation to be performed first. For example, the related operation task list 430 may list logistic tasks that needs to be performed before the fifth operation task can be performed. The timing of logistic tasks may be set based on timing of the operation task. For example, start time of an operation task may determine when logistic tasks for the operation task needs to be completed. Logistic tasks may have lead time requirement that specifies how long before the start of an operation task the logistic tasks needs to be completed (e.g., how long before start of an operation task material/equipment delivery needs to be completed. For example, change in start time for an operation task may cause change in arrival time of logistic tasks for the operation task so that the arrival time for the logistic tasks precede the start time by the lead time requirement.

The related operation task list 430 may list non-timing information for related operation tasks. For example, the related operation task list 430 may list the type of operation task (e.g., equipment material), product specification level, vendor, status, and/or other information for the related operation tasks.

In some implementations, a graphical user interface may include a non-productive time element for the operation tasks. Non-productive time may refer to time in which operation of a well has been stopped/paused. For example, non-productive time may refer to time in which drilling operation at the well has been ceased or penetrate rate is low. The non-productive time element may enable setting of non-productive time for the operation tasks. The non-productive time element may enable a user to input command(s) to set specific values for non-productive time for the operation tasks. Responsive to setting of non-productive time for an operation task, the operation task may be split into two sub-operation tasks surrounding the non-productive time. That is, the graphical user interface may change to show non-productive time for an operation task by splitting an operation task into (1) a part of the operation task before non-productive time, (2) non-productive time, and (3) a part of the operation task after non-productive time.

For example, referring to FIG. 4E, the graphical user interface 400 may include a non-productive time element 412 for the operation tasks listed in the graphical user interface 400. A user may interact with the non-productive time element 412 for an operation task to add non-product time to the operation task. For example, in FIG. 4E, a user may have interacted the non-productive time element 412 for the first operation task, which may cause non-productive time to be added to the first operation task. A field may be provided for a user to set estimated timing and/or actual timing of the non-productive time. In FIG. 4E, a user may have entered 3 hours as the estimated non-productive time.

The first operation task may be split into two sub-operation tasks surrounding the non-productive time. The first operation task may be split into (1) completed sub-operation task (how much of the operation task has been completed before non-productive time), and (2) resume sub-operation task (how much of the operation task needs to be completed after non-productive time. A user may be required to enter, into the sub-operation task preceding the non-productive time, how much actual time has been spent on the operation task. In FIG. 4E, a user may have entered 12 hours as the time spent so far on the operation task. The remaining time for the resume sub-operation task may be calculated based on how much time was assigned to the whole operation task, and how much time has been completed so far. For example, in FIG. 4E, 18.75 hours may have been planned for the operation task, and 12 hours may have been completed before non-productive time. The planned timing for the resume sub-operation task may be calculated as different between the time planned for the whole operation task and how much has been completed: 6.75 hours. Additional non-productive time may be added between sub-operation tasks. For example, non-productive time being set for an operation task may cause additional options to add non-productive time when a user interacts with the vertical dots 416 on the right side. Change in timing of an operation due to addition of non-productive time may be propagated to other operation tasks.

Information entered/used for non-productive time may not be exported to other well/hole sections. For example, a user may wish to copy timing of operation tasks entered in FIG. 4E as planned timing for a hole section of another well. When the hole section shown in FIG. 4E is completed, information on timing entered via the graphical user interface 400 may be exported to a database for use in another well/hole section. Export of the timing information to the database and/or export of the timing information from the database may filter out non-productive time so that non-productive time is not included. For example, the non-productive time may have taken 3 hours and the resume sub-operation task may have taken 1 hour. While the operation task may have taken total of 16 hours to complete (13 hours of working time; 3 hours of non-productive time), use of timing of this hole section for another well/hole section may result in a single corresponding operation being planned for 13 hours. Thus, only the actual working time of the operation task may be used to determine the planned time.

In some implementations, a graphical user interface may include a note element for the operation tasks. The note element may enable entry of notes for the operation tasks. The note element may enable a user to input command(s) to add notes to the operation tasks. For example, referring to FIG. 4E, the graphical user interface 400 may include a note element 414 to add notes to different operation tasks. A user may interface with the note element 414 for an operation task to add a note to the operation task.

In some implementations, a graphical user interface may include an offline element for the operation tasks. The offline element may enable a user to mark the operation tasks as being offline. The offline element may enable a user to input command(s) to mark the operation tasks as being offline. An operation task being offline may result in the operation task not being part of the sequence of operation tasks. An operation task being offline may result in the timing (e.g., start time, the end time, and/or the time duration) of the operation task may affecting the timing (e.g., start time and the end time) of online operation tasks. While the timing of online operation tasks may depend on each other, so that change in timing of one online operation task is propagated to other online operation tasks, timing of offline operation tasks may be independent of online operation tasks and/or other offline operation tasks. In some implementations, start time of multiple offline operation tasks may be adjusted at the same time. For example, user interaction with the vertical dots 416 of an offline operation task may provide an option for a user to adjust the start time of the offline operation task along with the start time of other offline activities that are tied together for start time.

In some implementations, a graphical user interface may enable a user to adjust the start time of the beginning of a hole section. For example, user interaction with the vertical dots 416 of the first operation task for a hole section may provide an option for a user to adjust the start time for the entire hole section. The option to adjust the start time of a hole section may be disabled (greyed out) when the actual timing of the operation task is entered.

In some implementations, a graphical user interface may enable a user to restore deleted operation tasks. Operation tasks that are deleted from the graphical user interface may be stored separately, and the graphical user interface may provide a listing of deleted operation tasks. A user may select one or more of the deleted operation tasks for restoration. In some implementations, a restored operation task may be restored back to its original location within the sequence of operation tasks. In some implementations, a restored operation task may be restored back to a different location (e.g., at the end) within the sequence of operation tasks.

Figure 5:
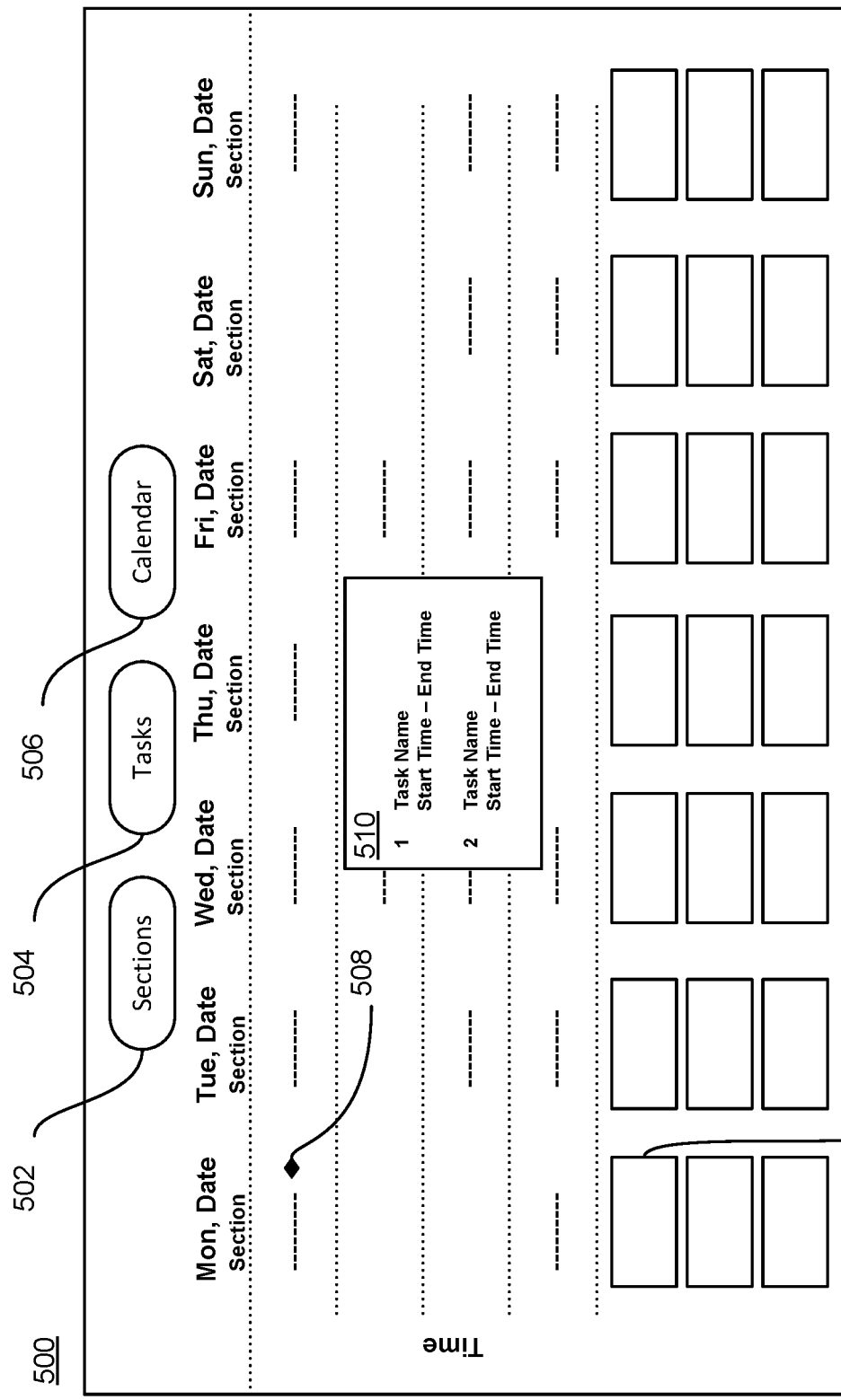
FIG. 5 illustrates an example graphical user interface.

Referring to FIG. 5, the graphical user interface 500 may include a sections view element 502, a tasks view element 504, and a calendar view element 506. The sections view element 502 may be the same as or similar to the section view element 302. The tasks view element 504 may be the same as or similar to the tasks view element 304. The calendar view element 506 may be the same as or similar to the calendar view element 306.

The graphical user interface 500 may include visualization of operation tasks in calendar form. The visualization of operation tasks may include arrangement of operation tasks arranged within a calendar. The operation tasks may be arranged based on the time and date of their start times. The start time, end time, the duration, and/or other information relating to the operation tasks may be presented. The graphical user interface 500 may include information on hole sections that are planned for different days (e.g., hole section listed below day/date). The graphical user interface 500 may include card element 512 (e.g., job cards) that represent logistic tasks tied to different operation tasks.

The card elements 512 may include information relating to the logistic tasks, such as name, description, category (e.g., equipment, services), product service line, vendor, notes, status (e.g., planned, ordered, received), and/or other information. Information relating to logistic tasks may be modified via user interaction with the card elements 512. The card elements 512 may be categorized based on type of logistic tasks (e.g., equipment, services). The card elements 512 may be filtered based on type of logistic tasks.

The card element 512 may include pinned cards and/or unpinned cards. A pinned card may refer to a card element for a logistic task where the timing of the logistic task is not automatically changed (e.g., change in timing of other operation tasks are not automatically propagated to the pinned logistic task). A pinned card may refer to a card element for a logistic task where the timing of the logistic task requires manual change. An unpinned card may refer to a card element for a logistic task where the timing of the logistic task is automatically change (e.g., change in timing of other operation tasks are automatically propagated to the unpinned logistic task). An unpinned card may refer to a card element for a logistic task where timing of the logistic task is automatically updated (e.g., when a change in made to a related/tied operation task, on a periodic basis).

The graphical user interface 500 may include an expand element 508. The expand element 508 may be presented for a particular time/time period when insufficient room exists within the graphical user interface 500 to list all operation tasks to be performed (e.g., started_at the particular time/time period. User interaction with the expand element 508 may cause the graphical user interface 500 to present all operation tasks assigned to the corresponding time/time duration. For example, referring to FIG. 5, responsive to user interaction with eh expand element 508, the graphical user interface 500 may present an operation task list 510. The operation task list 510 may list operation tasks to be performed at the corresponding time.

In some implementations, information relating to operation tasks entered/changed via user interaction with the graphical user interface(s) may be uploaded to one or more servers and/or one or more databases. For example, a user may interact with the graphical user interface(s) to changing timing of the operation tasks. Change made by the user may be stored locally until the user interacts with the graphical user interface(s) to publish the locally stored information to server(s) and/or database(s). A graphical user interface may provide options for the user to select range of times that will be uploaded (e.g., select how many days of operation task information will be uploaded). A graphical user interface may provide options for the user to add notes/comments to different hole sections and/or operation tasks. Standard language to be used as notes/comments may be prestored and provided for use by the user. The prestored language may be editable by the user for specific hole section/operation task. Such provision of standard language for hole sections/operation tasks may enable users to quickly enter notes/comments while using same type of language for same types of hole sections/operation tasks. Such provision of standard language for hole sections/operation tasks may enable users to enter notes for multiple hole sections/operation tasks before information is uploaded to server(s) and/or database(s).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
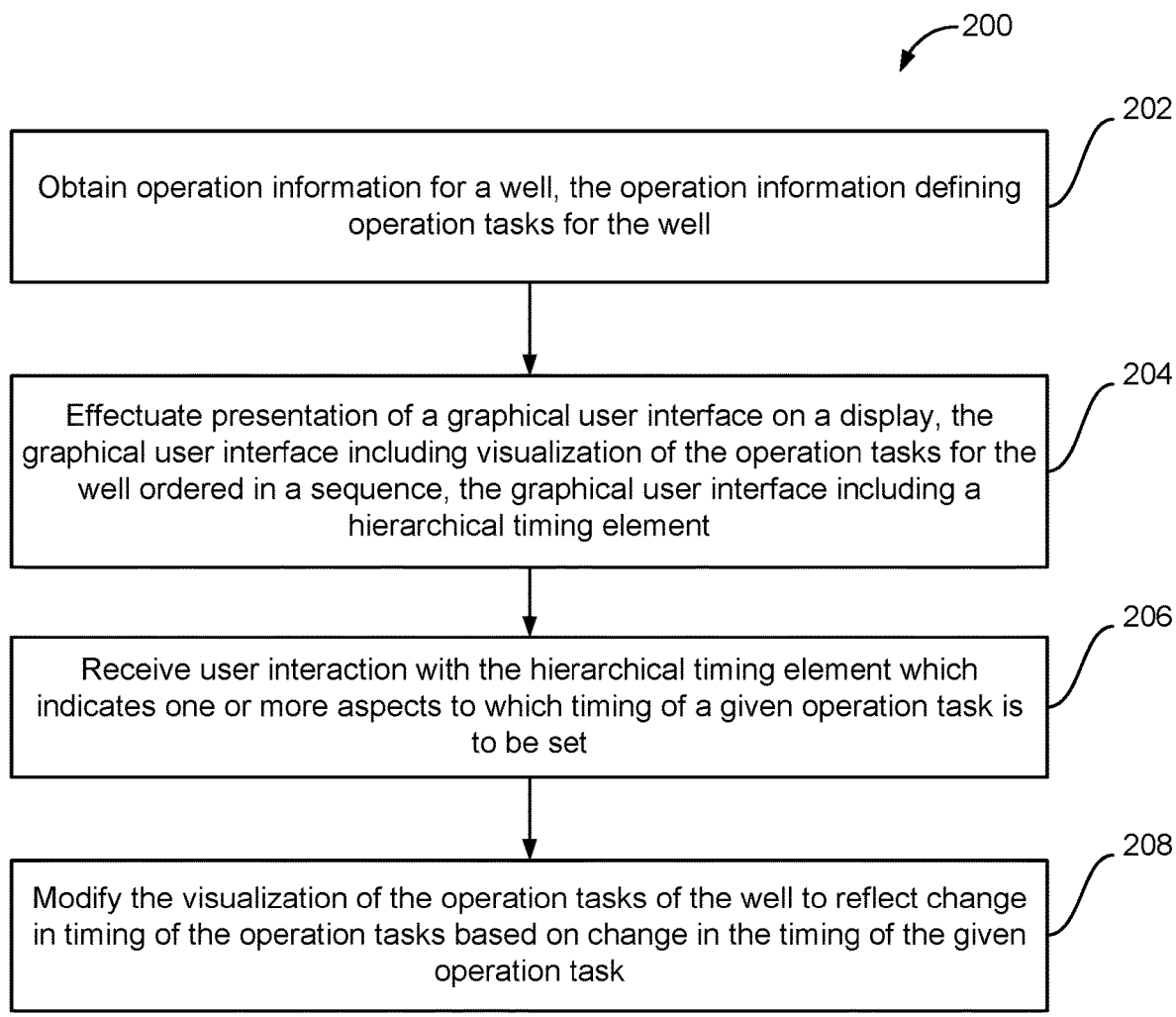
FIG. 2 illustrates an example method for managing tasks.

FIG. 2 illustrates method 200 for managing tasks. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, operation information for a well and/or other information may be obtained. The operation information may define operation tasks for the well. In some implementation, operation 202 may be performed by a processor component the same as or similar to the operation information component 102 (Shown in FIG. 1 and described herein).

At operation 204, presentation of a graphical user interface on a display may be effectuated. The graphical user interface may include visualization of the operation tasks for the well. The visualization of the operation tasks for the well may include the operation tasks ordered in a sequence. The graphical user interface may include a hierarchical timing element for the operation tasks. The hierarchical timing element may enable setting of timing of the operation tasks using different types of timing. Setting of a first type of timing may override setting of a second type of timing for a given operation task. In some implementation, operation 204 may be performed by a processor component the same as or similar to the presentation component 104 (Shown in FIG. 1 and described herein).

At operation 206, user interaction with the hierarchical timing element may be received. The user interaction with the hierarchical timing element may indicate one or more aspects to which the timing of the given operation task is to be set. The setting of the timing of the given operation task as indicated by the user interaction with the hierarchical timing element may change the timing of the given operation task. In some implementation, operation 206 may be performed by a processor component the same as or similar to the user interaction component 106 (Shown in FIG. 1 and described herein).

At operation 208, the visualization of the operation tasks of the well may be modified to reflect change in the timing of the operation tasks based on the change in the timing of the given operation task and/or other information. In some implementation, operation 208 may be performed by a processor component the same as or similar to the modification component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for managing tasks, the system comprising:
one or more physical processors configured by machine-readable instructions to:
obtain operation information for a well, the operation information defining operation tasks for the well;
effectuate presentation of a graphical user interface on a display, the graphical user interface including row-by-row visualization of the operation tasks for the well, the row-by-row visualization of the operation tasks for the well including the operation tasks ordered in rows, separate operation tasks presented in separate rows of the graphical user interface, the graphical user interface presenting start times, end times, and number values of planned timing for the operation tasks, wherein the graphical user interface further includes a hierarchical timing element and a non-productive time element for individual ones of the operation tasks, wherein:
the hierarchical timing element enables setting of timing of the operation tasks using different types of timing, wherein the hierarchical timing element for a given operation task includes an estimated timing numerical box and an actual timing, numerical box, the estimated timing numerical box enabling a user to enter a number value of estimated timing for the given operation task and the actual timing numerical box enabling the user to enter a number value of actual timing for the given operation task, wherein the planned timing, the estimated timing, and the actual timing for the given operation task are linked in a hierarchy such that user entry of the number value of estimated timing for the given operation task via the estimated timing numerical box overrides the number value of planned timing for the given operation task and user entry of the number value of actual timing for the given operation task via the actual timing numerical box overrides the number value of planned timing and the number value of estimated timing for the given operation task; and
the non-productive time element enables setting of non-productive time for the given operation task, wherein the non-productive time element for the given operation task includes a non-productive time button, the non-productive time button enabling the user to set non-productive time for the given operation task;
receive user interaction with the hierarchical timing element which indicates one or more aspects to which the timing of the given operation task is to be set, wherein the setting of the timing of the given operation task as indicated by the user interaction with the hierarchical timing element changes the timing of the given operation task, wherein the timing of the given operation task is changed to the number value of estimated timing based on the user entry of the number value of estimated timing for the given operation task via the estimated timing numerical box and the timing of the given operation task is changed to the number value of actual timing based on the user entry of the number value of actual timing for the given operation task via the actual timing numerical box; and
dynamically modify the row-by-row visualization of the operation tasks of the well in the graphical user interface to reflect change in the timing of the operation tasks based on the change in the timing of the given operation task, wherein the user entry of the number value of estimated timing for the given operation task via the estimated timing numerical box or the user entry of the number value of actual timing for the given operation task via the actual timing numerical box changes the timing of one or more subsequent operation tasks, the one or more subsequent operation tasks occurring after the given operation task, and the row-by-row visualization of the operation tasks of the well is dynamically modified to present the changed timing of the given operation task and the changed timing of the one or more subsequent operation tasks;
receive user interaction with the non-productive time element for the given operation task to set the non-productive time for the given operation task; and
responsive to the user interaction with the non-productive time element for the given operation task to set the non-productive time for the given operation task, dynamically modify the row-by-row visualization of the operation tasks of the well in the graphical user interface to show the given operation task as being paused and to create two new rows following a given row of the given operation task, the two new rows including a first new row for non-productive time following the given operation task and a second new row for a resume operation task following the non-productive time, the first new row including a first new estimated timing numerical box and a first new actual timing numerical box for the non-productive time, the second new row including a second new estimated timing numerical box, a second new actual timing numerical box, and a new non-productive time button for the resume operation task.

2. The system of claim 1, wherein:
the number value of planned timing for the given operation task includes a duration of time planned for performance of the given operation task;
the number value of estimated timing for the given operation task includes a duration of time estimated by the user for performance of the given operation task; and
the number value of actual timing for the given operation task includes a duration of time actually taken to perform the given operation task.

3. The system of claim 1, wherein the user entry of the number value of estimated timing for the given operation task via the estimated timing numerical box or the user entry of the number value of actual timing for the given operation task via the actual timing numerical box changes the timing of one or more preceding operation tasks, the one or more preceding operation tasks occurring before a given subsequent operation task.

4. The system of claim 3, wherein the change in the timing of the one or more preceding operation tasks includes change in the timing of one or more logistic tasks tied to the given subsequent operation task.

5. The system of claim 4, wherein the graphical user interface further includes a task list element for the given subsequent operation task, wherein the one or more logistic tasks tied to the given subsequent operation task are presented responsive to user interaction with the task list element.

6. The system of claim 1, wherein the operation tasks for the well are grouped based on hole sections for the well.

7. The system of claim 1, wherein after the non-productive time is set for the given operation task, the user is required to enter a number value of actual time that has been spent on the given operation task, the number value of actual time entered for the given operation task presented with given operation task before the non-productive time.

8. The system of claim 7, wherein responsive to user entry of the number value of actual time that has been spent on the given operation task, the row-by-row visualization of the operation tasks of the well in the graphical user interface is dynamically modified to present a remaining time for the resume operation task, the remaining time for the resume operation task determined based on (1) the number value of planned timing or the number value of estimated timing for the given operation task and (2) the number value of actual time entered for the given operation task.

9. A method for managing tasks, the method comprising:
obtaining operation information for a well, the operation information defining operation tasks for the well;
effectuating presentation of a graphical user interface on a display, the graphical user interface including row-by-row visualization of the operation tasks for the well, the row-by-row visualization of the operation tasks for the well including the operation tasks ordered in rows, separate operation tasks presented in separate rows of the graphical user interface, the graphical user interface presenting start times, end times, and number values of planned timing for the operation tasks, wherein the graphical user interface further includes a hierarchical timing element and a non-productive time element for individual ones of the operation tasks, wherein:
the hierarchical timing element enables setting of timing of the operation tasks using different types of timing, wherein the hierarchical timing element for a given operation task includes an estimated timing numerical box and an actual timing numerical box, the estimated timing numerical box enabling a user to enter a number value of estimated timing for the given operation task and the actual timing numerical box enabling the user to enter a number value of actual timing for the given operation task, wherein the planned timing, the estimated timing, and the actual timing for the given operation task are linked in a hierarchy such that user entry of the number value of estimated timing for the given operation task via the estimated timing numerical box overrides the number value of planned timing for the given operation task and user entry of the number value of actual timing for the given operation task via the actual timing numerical box overrides the number value of planned timing and the number value of estimated timing for the given operation task; and
the non-productive time element enables setting of non-productive time for the given operation task, wherein the non-productive time element for the given operation task includes a non-productive time button, the non-productive time button enabling the user to set non-productive time for the given operation task;
receiving user interaction with the hierarchical timing element which indicates one or more aspects to which the timing of the given operation task is to be set, wherein the setting of the timing of the given operation task as indicated by the user interaction with the hierarchical timing element changes the timing of the given operation task, wherein the timing of the given operation task is changed to the number value of estimated timing based on the user entry of the number value of estimated timing for the given operation task via the estimated timing numerical box and the timing of the given operation task is changed to the number value of actual timing based on the user entry of the number value of actual timing for the given operation task via the actual timing numerical box; and
dynamically modifying the row-by-row visualization of the operation tasks of the well in the graphical user interface to reflect change in the timing of the operation tasks based on the change in the timing of the given operation task, wherein the user entry of the number value of estimated timing for the given operation task via the estimated timing numerical box or the user entry of the number value of actual timing for the given operation task via the actual timing numerical box changes the timing of one or more subsequent operation tasks, the one or more subsequent operation tasks occurring after the given operation task, and the row-by-row visualization of the operation tasks of the well is dynamically modified to present the changed timing of the given operation task and the changed timing of the one or more subsequent operation tasks;

receiving user interaction with the non-productive time element for the given operation task to set the non-productive time for the given operation task; and responsive to the user interaction with the non-productive time element for the given operation task to set the non-productive time for the given operation task, dynamically modifying the row-by-row visualization of the operation tasks of the well in the graphical user interface to show the given operation task as being paused and to create two new rows following a given row of the given operation task, the two new rows including a first new row for non-productive time following the given operation task and a second new row for a resume operation task following the non-productive time, the first new row including a first new estimated timing numerical box and a first new actual timing numerical box for the non-productive time, the second new row including a second new estimated timing numerical box, a second new actual timing numerical box, and a new non-productive time button for the resume operation task.

10. The method of claim 9, wherein:

the number value of planned timing for the given operation task includes a duration of time planned for performance of the given operation task;

the number value of estimated timing for the given operation task includes a duration of time estimated by the user for performance of the given operation task; and the number value of actual timing for the given operation task includes a duration of time actually taken to perform the given operation task.

11. The method of claim 9, wherein the user entry of the number value of estimated timing for the given operation task via the estimated timing numerical box or the user entry of the number value of actual timing for the given operation task via the actual timing numerical box changes the timing of one or more preceding operation tasks, the one or more preceding operation tasks occurring before a given subsequent operation task.

12. The method of claim 11, wherein the change in the timing of the one or more preceding operation tasks includes change in the timing of one or more logistic tasks tied to the given subsequent operation task.

13. The method of claim 12, wherein the graphical user interface further includes a task list element for the given subsequent operation task, wherein the one or more logistic tasks tied to the given subsequent operation task are presented responsive to user interaction with the task list element.

14. The method of claim 9, wherein the operation tasks for the well are grouped based on hole sections for the well.

15. The method of claim 9, wherein after the non-productive time is set for the given operation task, the user is required to enter a number value of actual time that has been spent on the given operation task, the number value of actual time entered for the given operation task presented with given operation task before the non-productive time.

16. The method of claim 15, wherein responsive to user entry of the number value of actual time that has been spent on the given operation task, the row-by-row visualization of the operation tasks of the well in the graphical user interface is dynamically modified to present a remaining time for the resume operation task, the remaining time for the resume operation task determined based on (1) the number value of planned timing or the number value of estimated timing for the given operation task and (2) the number value of actual time entered for the given operation task.

* * * * *